US012118552B2

(12) United States Patent
Vukich et al.

(10) Patent No.: US 12,118,552 B2
(45) Date of Patent: *Oct. 15, 2024

(54) USER PROFILING BASED ON TRANSACTION DATA ASSOCIATED WITH A USER

(71) Applicant: Capital One Services, LLC, McLean, VA (US)

(72) Inventors: Adam Vukich, Alexandria, VA (US); George Bergeron, Falls Church, VA (US); James Zarakas, Centreville, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,060

(22) Filed: Dec. 6, 2022

(65) Prior Publication Data
US 2023/0099864 A1    Mar. 30, 2023

Related U.S. Application Data

(62) Division of application No. 16/886,017, filed on May 28, 2020, now Pat. No. 11,531,987.

(51) Int. Cl.
*G06Q 20/40* (2012.01)
*G06Q 20/38* (2012.01)

(52) U.S. Cl.
CPC ....... *G06Q 20/4014* (2013.01); *G06Q 20/389* (2013.01)

(58) Field of Classification Search
CPC .................................................. G06Q 20/389
(Continued)

(56) References Cited

U.S. PATENT DOCUMENTS 7,620,597 B2   11/2009   Eze
7,711,635 B2   5/2010   Steele et al.
(Continued)

FOREIGN PATENT DOCUMENTS

CN   106447434 A   2/2017

OTHER PUBLICATIONS

Kreiswirth et al., "Using Alternative Data to Evaluate Creditworthiness," Consumer Financial Protection Bureau, Feb. 16, 2017, pp. 1-6, retrieved from internet [URL: https://web.archive.org/web/20170505125609/https://www.consumerfinance.gov/about-us/blog/using-alternative-data-evaluate-creditworthiness/].

*Primary Examiner* — Mohammad Z Shaikh
*Assistant Examiner* — Michael J Warden
(74) *Attorney, Agent, or Firm* — Harrity & Harrity, LLP

(57) ABSTRACT

A user profile scoring platform may analyze a transaction log of a transaction account of a user to determine, based on transactions of the transaction log, a qualification status of the user, wherein the qualification status indicates that a characteristic of the user satisfies a threshold qualification metric. The user profile scoring platform may determine, based on the qualification status, a transaction-based score associated with the user, wherein the transaction-based score is determined using a transaction log analysis model. The user profile scoring platform may obtain, based on receiving the access information, a user score associated with a user transaction history that is associated with a plurality of transaction accounts that are associated with the user and different from the transaction account. The user profile scoring platform may perform an action based on the transaction-based score and the user score.

20 Claims, 11 Drawing Sheets

(58) Field of Classification Search
USPC .......................................................... 705/44
See application file for complete search history.

(56) References Cited

U.S. PATENT DOCUMENTS

| | | |
|---|---|---|
| 7,877,304 B1 | 1/2011 | Coulter |
| 8,073,732 B1 | 12/2011 | Ghosh et al. |
| 8,086,523 B1 | 12/2011 | Palmer |
| 9,710,852 B1 | 7/2017 | Olson et al. |
| 9,830,646 B1 | 11/2017 | Wasser et al. |
| 10,643,276 B1 | 5/2020 | Loddo et al. |
| 11,164,246 B2 | 11/2021 | Ghamsari et al. |
| 11,531,987 B2 | 12/2022 | Vukich et al. |
| 11,734,685 B2 * | 8/2023 | Phillips .................. G06Q 20/40 705/44 |
| 2006/0190310 A1 | 8/2006 | Gudla et al. |
| 2008/0208548 A1 | 8/2008 | Metzger et al. |
| 2009/0327036 A1 | 12/2009 | Ports, III et al. |
| 2010/0198724 A1 | 8/2010 | Thomas |
| 2010/0299260 A1 | 11/2010 | Thomas |
| 2011/0055065 A1 * | 3/2011 | Brenner .................. G06N 3/042 706/46 |
| 2011/0078073 A1 * | 3/2011 | Annappindi ........... G06Q 40/04 705/38 |
| 2011/0313884 A1 | 12/2011 | Eze |
| 2012/0278227 A1 | 11/2012 | Kolo et al. |
| 2013/0018795 A1 * | 1/2013 | Kolhatkar .......... G06Q 20/4016 705/44 |
| 2014/0310150 A1 | 10/2014 | Petty et al. |
| 2015/0142713 A1 | 5/2015 | Gopinathan et al. |
| 2017/0278185 A1 | 9/2017 | Veal, IV |
| 2019/0147469 A1 * | 5/2019 | Hu ........................ G06F 16/353 705/7.34 |
| 2019/0306082 A1 | 10/2019 | Horvath et al. |
| 2020/0074546 A1 | 3/2020 | Coulter |
| 2021/0133894 A1 * | 5/2021 | Reses ..................... G06N 20/00 |
| 2021/0374749 A1 * | 12/2021 | Vukich ................ G06Q 20/389 |

* cited by examiner

USER PROFILING BASED ON TRANSACTION DATA ASSOCIATED WITH A USER

RELATED APPLICATION

This application is a divisional of U.S. patent application Ser. No. 16/886,017 (now U.S. Pat. No. 11,531,987), filed May 28, 2020, which is incorporated herein by reference in its entirety.

BACKGROUND

A transaction account may include a checking account, a savings account, a rewards account, a credit account, a demand deposit account, and/or the like. A transaction account may be held by an individual at a financial institution. A transaction account may be accessible to an owner of the transaction account at a request by the owner (e.g., "on demand"). In addition, the transaction account may be available to other individuals, other than the owner of the account, as directed by the owner of the account.

SUMMARY

According to some implementations, a method may include analyzing, by a device and based on receiving access information, a transaction log of a transaction account of a user; determining, by the device and based on transactions of the transaction log, a qualification status of the user, wherein the qualification status indicates that a characteristic of the user satisfies a threshold qualification metric; determining, by the device and based on the qualification status, a transaction-based score associated with the user, wherein the transaction-based score is determined using a transaction log analysis model that is trained based on: historical data associated with previous transactions of other transaction logs, and previous scores associated with users of the other transaction logs; obtaining, by the device and based on receiving the access information, a user score associated with a user transaction history that is associated with a plurality of transaction accounts that are associated with the user and different from the transaction account; and performing, by the device, an action based on the transaction-based score and the user score.

According to some implementations, a device may include one or more memories and one or more processors. In some implementations, the one or more processors are communicatively coupled to the one or more memories. The one or more processors may be configured to: determine a qualification status of a user of a transaction account, wherein the qualification status indicates that a characteristic of the user satisfies a threshold qualification metric; analyze, based on the qualification status and using a transaction log analysis model, a transaction log of the transaction account, wherein the transaction log analysis model is configured to determine a transaction-based score based on at least one of: a percentage of the transactions identified in the transaction log that are associated with a particular transaction type, or a time period associated with the transactions; obtain, based on receiving access information associated with the user, a user score associated with the user, wherein the user score is based on a user transaction history that is associated with a plurality of transaction accounts that are different from the transaction account; and perform an action based on the transaction-based score and the user score.

According to some implementations, a non-transitory computer-readable medium may store one or more instructions. The one or more instructions, when executed by one or more processors of a device, may cause the one or more processors to: monitor, based on receiving access information associated with a user, a transaction log of a transaction account of the user, wherein the access information includes a user authorization to monitor the transaction log; determine a qualification status of the user; determine a transaction-based score, associated with a transaction account of the user, based on the qualification status indicating that a characteristic of the user satisfies a threshold qualification metric, wherein the transaction-based score is based on a quantity of transactions that are identified in a transaction log, of the transaction account, as being associated with a particular type; determine that the transaction-based score satisfies a threshold score that is associated with the qualification status; and perform, based on the transaction-based score satisfying the threshold score, an action associated with the user.

DETAILED DESCRIPTION

Figure 1A:
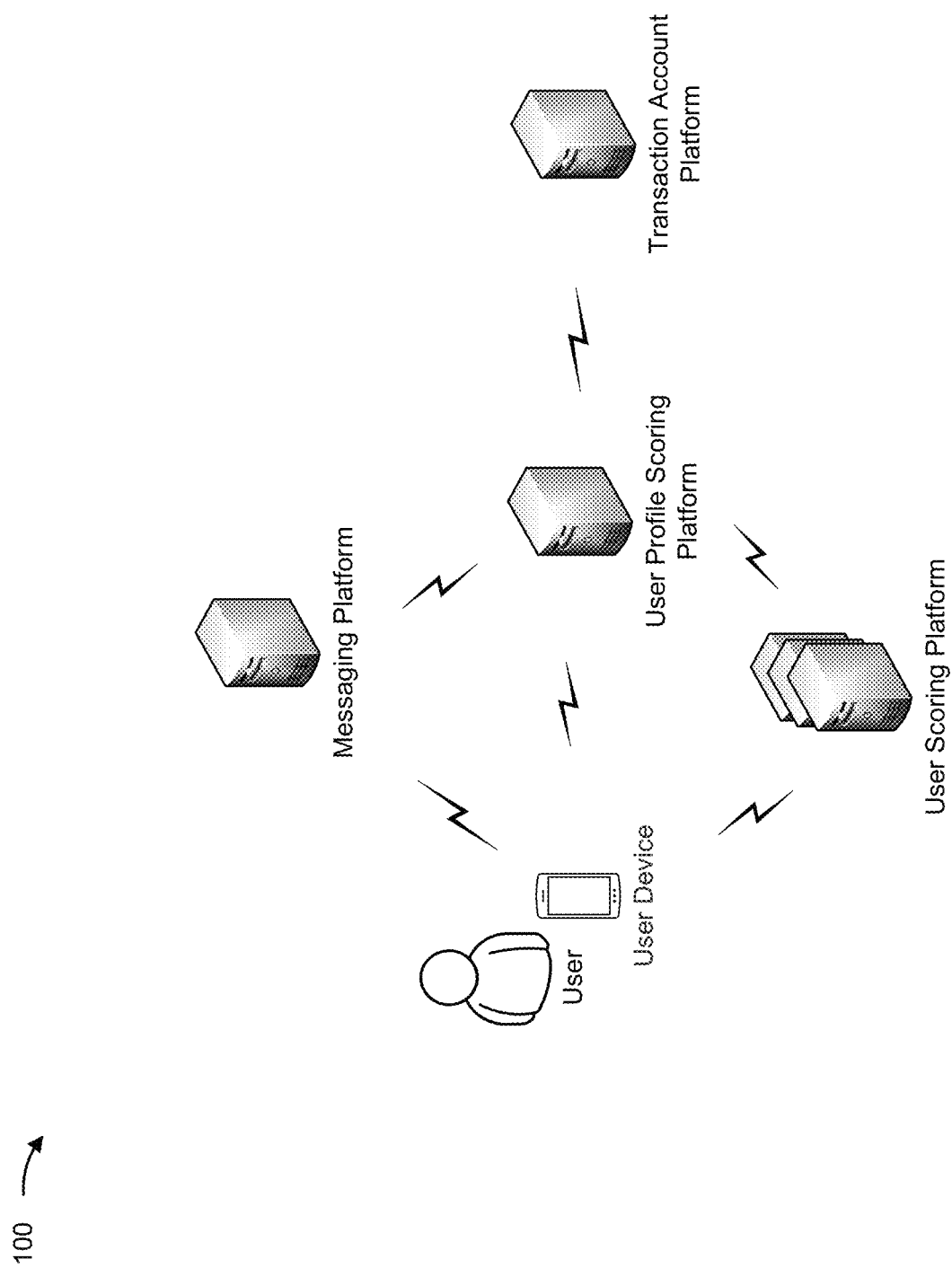
FIGS. 1A-1E are diagrams of an example implementation described herein.

The following detailed description of example implementations refers to the accompanying drawings. The same reference numbers in different drawings may identify the same or similar elements.

A credit score may represent a creditworthiness of an individual. Typically, a credit score is based on the individual's history associated with one or more credit accounts. For example, the credit score may be based on a number of credit accounts, a total credit limit, a total amount of debt, one or more types of the debt (e.g., revolving debt, installment debt, open debt, and/or the like), a payment history associated with the debt, an age of the debt, a diversity of the debt, an amount and/or type of credit inquiries, and/or the like, associated with the user. However, the individual's history associated with a transaction account, such as checking account, a savings account, and/or the like, is not factored into the algorithm that generates the credit score. Consequently, an individual that has a history of high income, low payment requirements, and/or high cash flow in a transaction account, but does not utilize (or does not utilize at a high-level) credit accounts, may not have a credit score that accurately reflects the individual's creditworthiness. This may impact the individual's ability to borrow money (e.g., to buy a house, a car, and/or the like) and/or cause the individual to be subject to a higher lending rate than the individual would otherwise be if the individual had developed a robust credit history. Accordingly, due to the inaccurate credit score, the individual may use a user device to shop for and enroll in services to increase the individual's credit score (e.g., to cause the individual to be eligible for a better lender rate, better lending terms, and/or the like), which wastes computing resources (e.g., processing resources, memory resources, power resources, and/or the like).

Some implementations described herein provide a user profile scoring platform that analyzes a transaction log of a transaction account of a user to determine a transaction-based score (e.g., an estimate of a credit score of the user based on transactions of the transaction log). The user profile scoring platform may determine the transaction-based score using a transaction log analysis model that comprises a machine learning model that has been trained based on historical data associated with previous transactions of other transaction logs, previous transaction-based scores associated with users of the other transaction logs, previous user scores (e.g., credit scores) associated with the users of the other transaction logs, and/or the like. In some implementations, the user profile scoring platform may obtain a user score associated with the user (e.g., a credit score of the user) and may perform one or more actions based on the transaction-based score and the user score. For example, the user profile scoring platform may cause, when a difference between the transaction-based score and the user score satisfies (e.g., is greater than or equal to) a threshold, the user to be pre-authorized for a future transaction involving a product (e.g., cause the user to be pre-authorized to make purchases using a credit product, such as a credit card) and may cause an offer for the product to be provided to the user.

In this way, the user profile scoring platform enables a user of a transaction account to increase a user score (e.g., a credit score) of the user. This may allow the user to qualify for loans that the user would not otherwise qualify for and/or to qualify for lower lending rates than the user would otherwise be subject to without intervention by the user profile scoring platform. This prevents waste of computing resources (e.g., processing resources, memory resources, power resources, and/or the like) associated with shopping for and/or enrolling in services to increase the user score. Moreover, because the user profile scoring platform can identify and notify the user that the user score may be increased at a time before the user may need to utilize an increased user score, the user may be able to increase the user score over time based on typical financial activity, rather than increasing the score based on atypical financial activity (e.g., unnecessarily obtaining and repaying debt). This may conserve computing resources (e.g., processing resources, memory resources, power resources, and/or the like) of any device that would be needed to perform the atypical financial activity.

FIGS. 1A-1E are diagrams of an example implementation 100 associated with user profiling based on transaction data associated with a user. As shown in FIG. 1A, example implementation 100 includes a user device (e.g., of a user), a messaging platform, a user scoring platform, a user profile scoring platform, and/or a transaction account platform. Furthermore, in example implementation 100, the user profile scoring platform may be in communication with the user device, the messaging platform, the user scoring platform, and/or the transaction account platform, and the user device may interact with the messaging platform and/or the user scoring platform.

As described herein, a transaction account (e.g., a financial transaction account, such as a checking account, a savings account, and/or the like) may be associated with (e.g., registered to, available to, and/or the like) a user to permit the user to engage in transactions via the transaction account (e.g., using funds associated with the transaction account). The transaction account may be managed and/or maintained by the transaction account platform for the user (e.g., using a transaction log to permit the user to view and/or access transaction activity of the transaction account). In some implementations, the transaction account platform may manage hundreds, thousands, or more transaction accounts, each of which may be used in hundreds, thousands, or more transactions, and/or the like.

In some implementations, a messaging account may include an email account, a text messaging account, an instant messaging account, a voice messaging account, and/or the like. In some implementations, a messaging account may be associated with messages (e.g., stored on the user device, stored on the messaging platform utilized by the user of the user device, and/or the like), such as email messages, text messages, instant messages, and/or the like associated with the user (e.g., messages sent by or to the user). In some implementations, a messaging account may store hundreds, thousands, or more messages from hundreds, thousands, or more third parties, that include different types of content (e.g., personal content, transaction-related content, and/or the like).

In some implementations, the user scoring platform may provide, interface with, or otherwise be associated with a service to track a user score of the user (e.g., a credit score of the user), user score history information (e.g., credit history information of the user), and/or the like. In some implementations, as shown in FIG. 1C, the user scoring platform may be an internal user scoring platform (e.g., that is associated with a same organization (e.g., a financial organization) as the user profile scoring platform) or, as shown in FIG. 1D, the user scoring platform may be an external user scoring platform (e.g., that is not associated with the same organization as the user profile scoring platform).

Figure 1B:
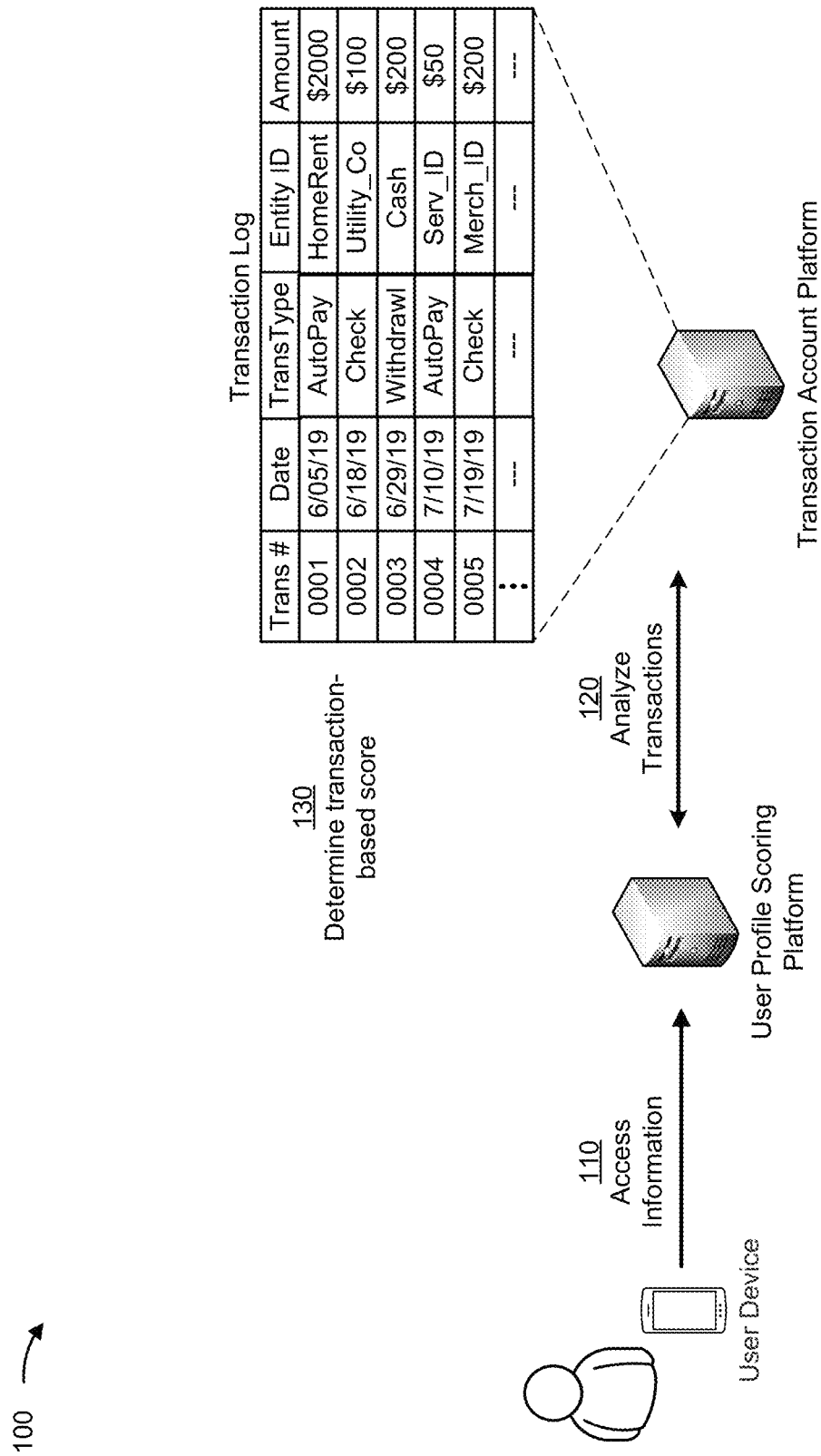
Figure 1C:
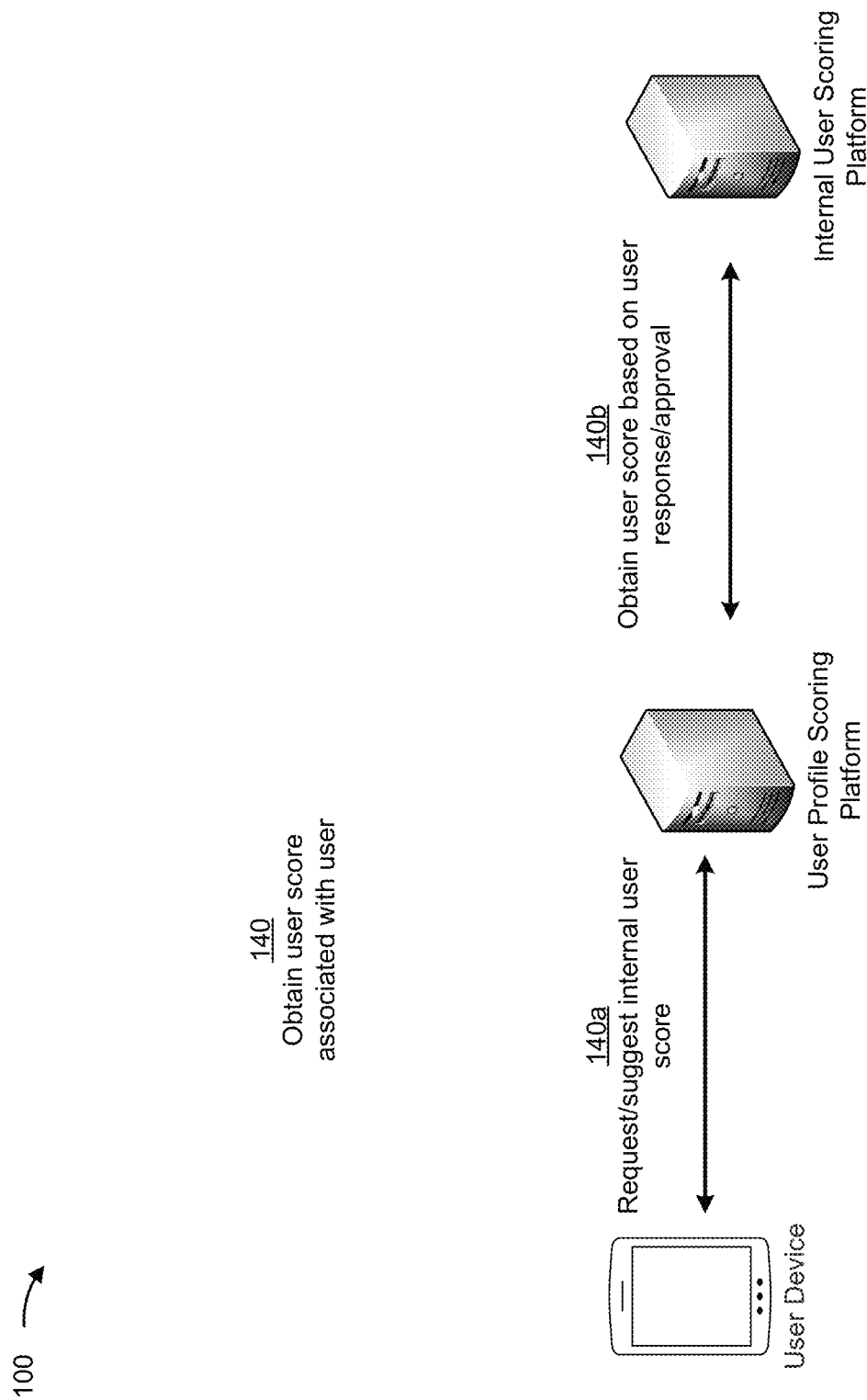
Figure 1D:
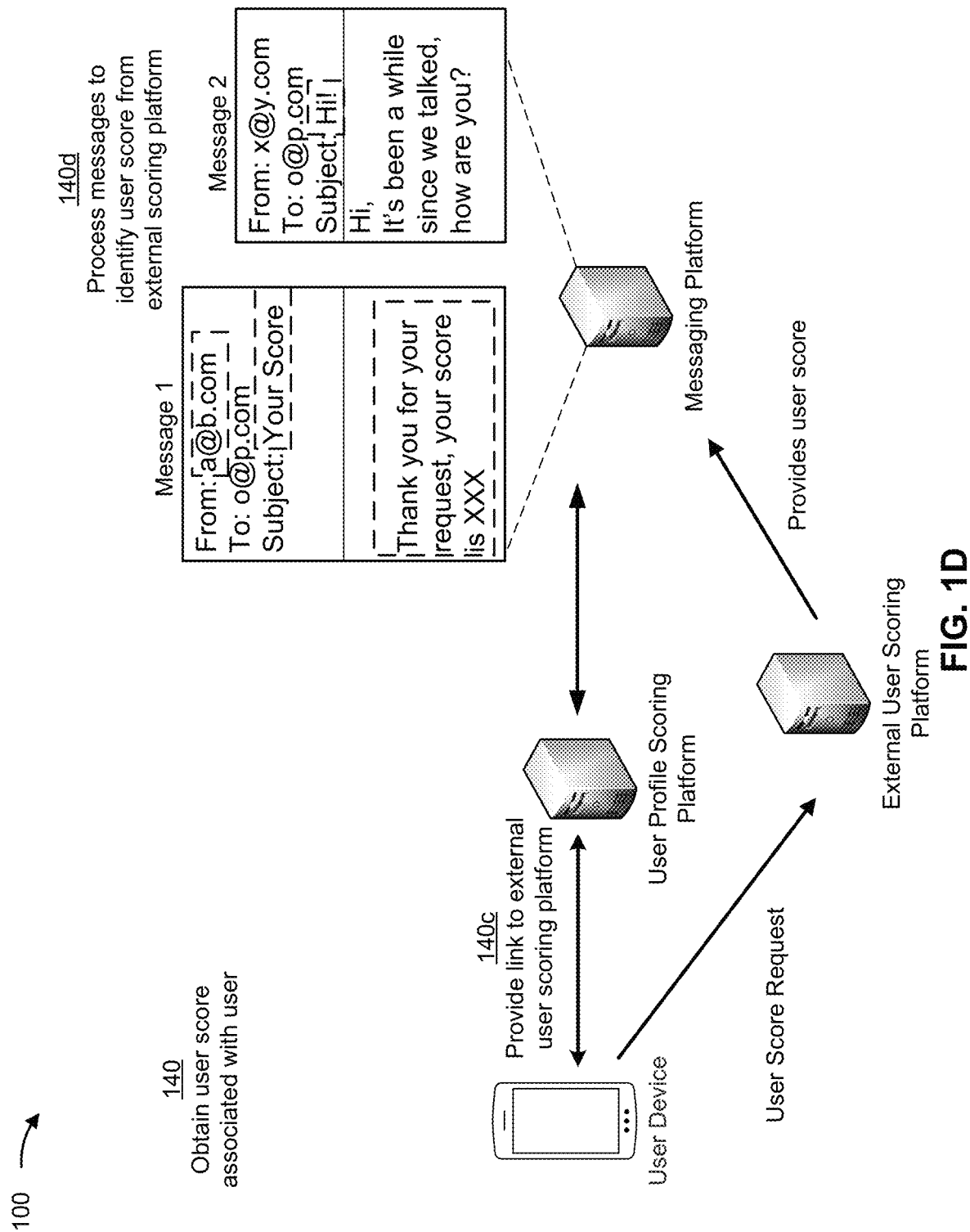

As shown in FIG. 1B, and by reference number 110, the user profile scoring platform may receive, from the user device, access information (e.g., that permits the user profile scoring platform to monitor and/or analyze one or more accounts associated with the user). For example, the user device may be associated with a user, and the access information may include a set of credentials associated with an account of the user, such as a transaction account (e.g., a financial account, such as a checking account, a savings account, and/or the like) of the user, a messaging account of the user, and/or the like. The set of credentials may include a username/password combination for the user and the account, a security token (e.g., that provides limited access to the account) associated with the user and the account, a biometric identifier associated with the user, and/or the like.

In some implementations, the user profile scoring platform may receive the access information based on requesting the access information from the user device (e.g., by providing a prompt via a display associated with the user device), based on a user of the user device inputting the access information (e.g., via a user interface, via an application installed on the user device, and/or the like), and/or the like. According to some implementations, the user profile scoring platform may perform a verification process to verify that a user that provided the input is an authorized user of the user device and/or an authorized user associated with an account described herein. Such a verification process may include requesting and processing credentials (e.g., a username, password, personal identification number, and/or the like) associated with an authorized user, personal information associated with an authorized user, security information associated with an authorized user, biometric information associated with an authorized user, and/or the like to authenticate the user. In some implementations, the user profile scoring platform may utilize a two-factor authentication process to receive authorization information from the user.

To maintain privacy of a user associated with a transaction account, the user profile scoring platform may ensure that the user opts in (e.g., via the access information) to enable access to the messaging account, monitoring and/or analyzing of transactions and/or access to the transaction account, and/or the like, monitoring and/or access to private information of the user, and/or the like. Accordingly, the user profile scoring platform may be configured to abide by any and all applicable laws with respect to maintaining the privacy of the user and/or content of the user's messaging account, transaction account, and/or the like. In some implementations, the user profile scoring platform may not download (or permanently store) any messages, transaction information, and/or the like, from the user device, the user profile scoring platform may anonymize and/or encrypt any private information associated with the user and/or accounts, messages, and/or the like.

In some implementations, the user profile scoring platform may have or may be configured to have limited access to the transaction account, the messaging account, and/or the like. For example, the user profile scoring platform may be configured to only have access to the transaction account periodically and for a threshold time period and/or to a limited number of most recently posted transactions (e.g., the last ten transactions, twenty transactions, and/or the like), to only have access to a limited number of most recently received messages (e.g., the last ten messages, twenty messages, and/or the like), to only have access to messages with certain keywords or phrases (e.g., keywords or phrases representative of a transaction), to only have access to a particular folder of messages (e.g., a specific inbox), and/or the like. According to some implementations, the user may specify which information and/or the types of information that the user profile scoring platform may have access to and/or receive.

As further shown in FIG. 1B, and by reference number 120, the user profile scoring platform analyzes a plurality of transactions via the transaction account platform. For example, the user profile scoring platform may analyze a plurality of transactions in a transaction log of a transaction account associated with the user. The user profile scoring platform may process the plurality of transactions to identify one or more transactions (e.g., income transactions, transactions from an entity that provides unemployment benefits, mortgage payment or rent payment transactions, bill payment transactions, utility payment transactions, and/or the like). In some implementations, the one or more transactions may be associated with an income of the user, a payment requirement of the user, a cash flow of the user, and/or the like.

As shown, the user profile scoring platform may access (e.g., based on the access information) a transaction account (e.g., a transaction account maintained by the transaction account platform) of the user and process the transactions in the transaction account (e.g., transactions that are maintained and/or stored in a transaction log of the transaction account platform). In some implementations, the transaction log may include amounts of transactions, entities associated with transactions, types of transactions, transaction identifiers (e.g., transaction numbers), transaction dates, and/or the like. In some implementations, the user profile scoring platform may process hundreds, thousands, or more transactions in hundreds, thousands, or more transaction accounts associated with hundreds, thousands, or more users, and thus may provide big data capability. The big data handled by user profile scoring platform may be so voluminous and complex that traditional data processing applications cannot be used and/or that the big data cannot be processed objectively by a human actor.

In some implementations, the user profile scoring platform may process the transaction log using a combination of processing techniques to identify the one or more transactions. For example, the user profile scoring platform may process the transaction log using a text processing technique (e.g., a natural language processing technique, a text analysis technique, and/or the like), a code processing technique, and/or the like. In some implementations, the user profile scoring platform may process the transaction log using an image processing technique (e.g., a computer vision technique, an optical character recognition (OCR) technique, and/or the like to identify text corresponding to transactions of the transaction log).

In some implementations, when processing the transaction log using the text processing technique, the user profile scoring platform may process text of entries in the transaction log to identify terms, phrases, and/or the like included in the text (e.g. to extract information related to a transaction). For example, the user profile scoring platform may process the text of the transactions to identify terms and/or phrases that may be likely related to a source of income (e.g., an employer, an unemployment benefits agency, a transfer from a savings account, a retirement account, and/or the like), a payee of a payment (e.g., a recipient of a mortgage or rent payment, a recipient of a bill payment, and/or the like), and/or the like.

In some implementations, when processing the transaction log using the code processing technique, the user profile scoring platform may process code associated with the transaction log to identify a transaction included in the transaction log, to identify information related to a transaction, and/or the like. For example, the user profile scoring platform may analyze code (e.g., hypertext markup language (HTML) code, cascading style sheet (CSS) code, and/or the like) associated with the transaction log and/or transaction account platform, tags within the code (e.g., a div tag, an image tag, text-related tags, and/or the like) that are associated with the transactions, and/or the like.

In some implementations, by processing the code, tags within the code, and/or the like, the user profile scoring platform may be capable of identifying text within the transaction log. For example, the user profile scoring platform may be configured with information that identifies a hierarchy of the code associated with the transaction log (e.g., the code may be structured in a hierarchical manner that impacts execution of the code, tags associated with the code may have a hierarchical structure to organize entries of the transaction log in the code and/or to impact a manner in which the transaction log is provided for display, and/or the like).

In some implementations, the user profile scoring platform may scan the hierarchical structure of the code associated with a transaction log to identify a transaction, to identify information related to the transaction log (entries corresponding to transactions in the transaction log), and/or the like. For example, the user profile scoring platform may scan the hierarchical structure of the code to identify fields, entries, and/or text in the code. Continuing with the previous example, if the user profile scoring platform identifies a field in the code of the transaction, then the user profile scoring platform may scan the hierarchical structure (e.g., tags that are at a higher or lower level in the hierarchical structure) to identify information (e.g., text, metadata, an entry, and/or the like) that may be associated with the field. Continuing still with the previous example, the user profile scoring platform may then process the information associated with the field to determine whether the field is associated with a transaction (e.g., using a text processing technique to identify terms, phrases, values, and/or the like included in the information that indicates that the field is a field of an entry for the transaction).

In this way, the user profile scoring platform may analyze the transaction log to identify the one or more transactions associated with an income of the user, a payment requirement of the user, a cash flow of the user, and/or the like.

In some implementations, the user profile scoring platform may receive a user input associated with a characteristic of the user (an income of the user, a payment requirement of the user, a cash flow of the user, and/or the like). In some implementations, the user profile scoring platform may receive the user input based on requesting the user input from the user device (e.g., by providing a prompt via the display associated with the user device). For example, the user profile scoring platform may request an income of the user, the user may interact with a user interface of the user device to generate user input that indicates the income of the user, and the user device may send the user input to the user profile scoring platform. In this way, the user profile scoring platform may determine the characteristic of the user. Additionally, or alternatively, the user profile scoring platform may process the one or more transactions to determine the characteristic of the user (e.g., estimate the characteristic of the user). For example, the user profile scoring platform may sum a set of income transactions of the one or more transactions to estimate the income of the user.

In some implementations, the user profile scoring platform may determine a qualification status of the user (e.g., based on the characteristic of the user). The qualification status may indicate whether determining a transaction-based score, as described herein, would be helpful and/or useful to the user (e.g., the qualification status may indicate that the characteristic of the user satisfies a threshold qualification metric). For example, when the characteristic is an income of the user, the qualification status may indicate whether the income of the user satisfies (e.g., is greater than or equal to) a threshold income metric (e.g., whether the user is a high-income earner). As another example, when the characteristic is a cash flow of the user, the qualification status may indicate whether cash flow of the user satisfies a threshold cash flow metric (e.g., whether the user has a high, positive cash flow). When the qualification status indicates that the characteristic of the user satisfies the threshold qualification metric, the user profile scoring platform may perform the additional processing steps described herein. Otherwise, when the qualification status does not indicate that the characteristic of the user satisfies the threshold qualification metric, the user profile scoring platform may cease performing any additional processing steps described herein and/or may send a message to the user device indicating that the user is not a candidate for determining a transaction-based score.

As further shown in FIG. 1B, and by reference number 130, the user profile scoring platform may determine a transaction-based score associated with the user. The transaction-based score may be an estimate of a user score (e.g., a credit score of the user) that is based on the transaction log of the transaction account. In some implementations, the user profile scoring platform may process the one or more transactions to determine the transaction-based score. For example, the user profile scoring platform may process the one or more transactions to determine a monthly income of the user, a monthly payment requirement of the user, a monthly cash flow of the user, and/or the like, and may use an algorithm to determine the transaction-based score based on the monthly income of the user, the monthly payment requirement of the user, the monthly cash flow of the user, and/or the like. In some implementations, the user profile scoring platform may determine the transaction-based score based on other time-periods associated with the one or more transactions, such as daily, weekly, semimonthly, and/or the like.

In some implementations, the user profile scoring platform may determine the transaction-based score using a transaction log analysis model. For example, the user profile scoring platform may process the one or more transactions using the transaction log analysis model to determine the transaction-based score. The transaction log analysis model may comprise a machine learning model that has been trained based on historical data associated with previous transactions of other transaction logs, previous transaction-based scores associated with users of the other transaction logs, previous user scores (e.g., credit scores) associated with the users of the other transaction logs, and/or the like. Using the historical data as inputs to the machine learning model, the machine learning model may be trained to identify one or more relationships for determining the transaction-based score. The machine learning model may be trained and/or used in a similar manner to that described below with respect to FIG. 2.

As shown in FIGS. 1C and 1D, and by reference number 140, the user profile scoring platform may obtain a user score associated with the user (e.g., a credit score of the user). In some implementations, the user score may be associated with a transaction history associated with one or more transaction accounts (e.g., that does not include the transaction account). For example, the user score may comprise a credit score of the user that is based on a credit history of the user in association with one or more credit transaction accounts of the user.

In some implementations, the user profile scoring platform may obtain the user score based on determining the transaction-based score. For example, the user profile scoring platform may obtain the user score to compare the user score and the transaction-based score (e.g., to determine whether to perform one or more actions) as described herein in relation to FIG. 1E. FIG. 1C shows the user profile scoring platform obtaining the user score via an internal user scoring platform, while FIG. 1D shows the user profile scoring platform obtaining the user score via an external user scoring platform.

As shown in FIG. 1C, the user profile scoring platform may interact with the user device and the internal user scoring platform to obtain the user score. As further shown in FIG. 1C, and by reference number 140a, the user profile scoring platform may send a message requesting, or suggesting obtaining, a user score (e.g., an "internal" user score from the internal user scoring platform) to the user device. The user device may display the message on the display of the user device. The user device may send a response indicating whether the user profile scoring platform is approved to obtain the user score. For example, the user device may allow the user to enter (via the user interface of the user device) input indicating whether the user profile scoring platform is approved to obtain the user score, which may cause the user device to generate and send the response to the user profile scoring platform. When the response indicates that the user profile scoring platform is not approved to obtain the user score, the user profile scoring platform may perform at least one of the one or more actions described herein in relation to FIG. 1E and reference number 160 that are based on just the transaction-based score.

As shown by reference number 140*b*, when the response indicates that the user profile scoring platform is approved to obtain the user score, the user profile scoring platform may obtain the user score from the internal user scoring platform. For example, the user profile scoring platform may send a query (e.g., that includes some or all of the access information, such as the user's identification information) to the internal user scoring platform. The internal user scoring platform may search, based on the access information and in response to the query, a data structure (e.g., that respectively stores user scores in association with user information in a plurality of entries of the data structure) to identify an entry associated with the user that includes the user score. Accordingly, the internal user scoring platform may send the user score to the user profile scoring platform.

Additionally, or alternatively, as shown in FIG. 1D, the user profile scoring platform may obtain the user score from the user device, the external user scoring platform, and/or the messaging platform. For example, the user profile scoring platform may send a message requesting or suggesting obtaining a user score (e.g., an "external" user score from the external user scoring platform) to the user device. The user device, in a similar manner as that described herein in relation to FIG. 1C and reference number 140*a*, may generate and send a response indicating whether the user profile scoring platform is approved to obtain the user score. When the response indicates that the user profile scoring platform is not approved to obtain the user score, the user profile scoring platform may perform at least one of the one or more actions described herein in relation to FIG. 1E and reference number 160 that are based on just the transaction-based score.

As further shown in FIG. 1D, and by reference number 140*c*, when the response indicates that the user profile scoring platform is approved to obtain the user score, the user profile scoring platform may provide a link (e.g., a hypertext transfer protocol (HTTP) link) to the user device to allow the user device to initiate a communication session with the external user scoring platform. The user profile scoring platform may not be authorized to directly obtain the user score from the external user scoring platform, so, accordingly, the user profile scoring platform may send the link to the user device.

To initiate the communication session with the external user scoring platform, the user device may send user information (e.g., that includes information identifying the user, a set of credentials, and/or the like) to the external user scoring platform. According to some implementations, the external user scoring platform may perform a verification process to verify the user, in a similar manner as that described herein in relation to FIG. 1B and reference number 110. Based on verifying the user, the external user scoring platform may allow the communication session to be established between the user device and the external user scoring platform.

After the communication session is established, the user profile scoring platform may receive, from the user device, a request for the user score. For example, the user device may allow the user to enter (via the user interface of the user device) input indicating a command to obtain the user score, which may cause the user device to generate and send the request (e.g., that includes the user's identification information) to the external user scoring platform. The external user scoring platform may search, in response to the request, a data structure (e.g., that respectively stores user scores in association with user information in a plurality of entries of the data structure) to identify an entry associated with the user that includes the user score. Accordingly, the external user scoring platform may send the user score to the user device, which may send the user score to the user profile scoring platform.

Additionally, or alternatively, the external user scoring platform may send a message (e.g., an email message, a text message, an instant message, and/or the like) that includes the user score to a messaging account associated with the user. In some implementations, the message may be sent to the messaging platform for storage.

As further shown in FIG. 1D, and by reference number 140*d*, the user profile scoring platform may process messages to identify the user score. As shown, the user profile scoring platform may access the messaging account (e.g., that is maintained by the messaging platform) of the user and process the messages in the messaging account (e.g., messages that are maintained and/or stored by the messaging platform). For example, the user profile scoring platform may process the messages to identify the message that includes the user score. In some implementations, the user profile scoring platform may process hundreds, thousands, or more messages in hundreds, thousands, or more messaging accounts associated with hundreds, thousands, or more users. Accordingly, the user profile scoring platform may perform one or more rigorous computerized processes to process the messages of the messaging account.

In some implementations, the user profile scoring platform may identify terms and/or phrases included in a subject line and/or in a body of a message to identify the message that includes the user score. For example, as shown in FIG. 1D, a first message (shown as message 1) from a first sender (shown as "a@b.com" in a sender field of the first message) includes a subject line (e.g., shown as "Your Score"). The user profile scoring platform may determine that the first sender is associated with the external user scoring platform and/or that the subject line is associated with the user score. The user profile scoring platform may therefore determine that the first message likely includes the user score. Accordingly, the user profile scoring platform may parse the body of the first message to identify the user score (e.g., shown as "XXX"). As another example, as shown in FIG. 1D, a second message (shown as message 2) from a second sender (shown as "x@y.com" in a sender field of the first message) includes a subject line (e.g., shown as "Hi!"). The user profile scoring platform may determine that the second sender is not associated with the external user scoring platform and/or that the subject line is not associated with the user score. The user profile scoring platform may therefore determine, based on the sender field and/or the subject line, that the second message likely does not include the user score and may ignore and/or disregard the message.

Figure 1E:
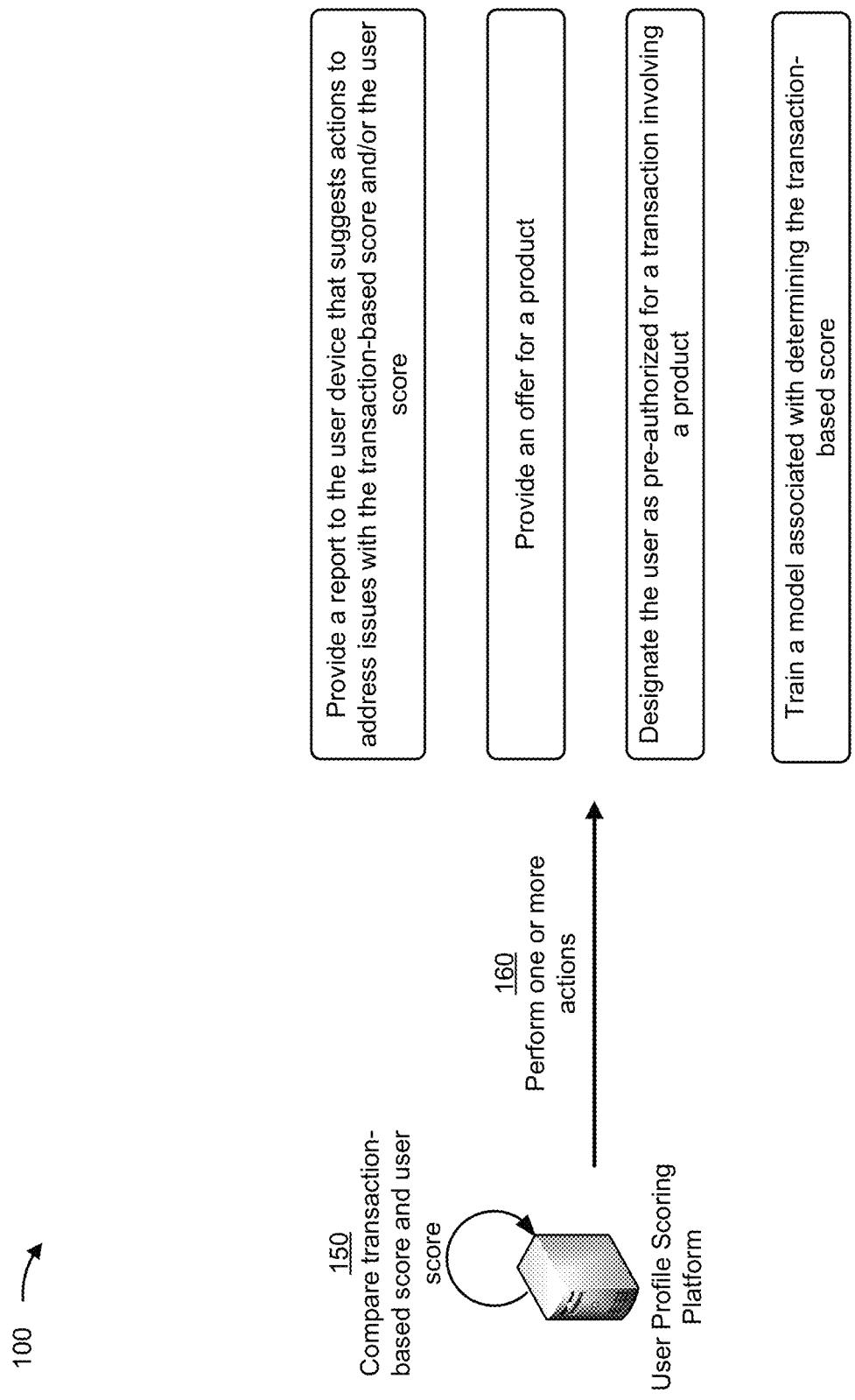

As shown in FIG. 1E, and by reference number 150, the user profile scoring platform may compare the transaction-based score and the user score. For example, the user profile scoring platform may determine whether the transaction-based score is greater than the user score. As another example, the user profile scoring platform may determine a difference between the transaction-based score and the user score (e.g., the transaction-based score minus the user score)

and may determine whether the difference satisfies (e.g., is greater than or equal to) a threshold.

As further shown in FIG. 1E, and by reference number 160, the user profile scoring platform may perform one or more actions (e.g., based on determining that the transaction-based score is greater than the user score, that the difference between the transaction-based score and the user score satisfies the threshold, and/or the like). For example, the one or more actions may include training (or retraining) the transaction log analysis model based on the transaction-based score, the user score, the difference between the transaction-based score and the user score, transaction data associated with the transaction log of the transaction account, and/or the like. In this way, the user profile scoring platform may improve the accuracy of the transaction log analysis model in determining a transaction-based score based on transaction data.

In some implementations, the one or more actions may include determining a condition associated with the user (e.g., whether the user has an inappropriately low credit). For example, the user profile scoring platform may determine (e.g., based on determining that the transaction-based score is greater than the user score, that the difference between the transaction-based score and the user score satisfies the threshold, and/or the like) that a product (e.g., a credit product, such as a credit card) could be utilized by the user to increase the user's user score (e.g., reduce the difference between the transaction-based score and the user score). Accordingly, the user profile scoring platform may provide to the user, via the user device, a report that indicates the transaction-based score, the user score, the difference between the transaction-based score and the user score, the transaction data associated with the transaction log of the transaction account, and/or the like, and/or suggest actions that the user may take to address issues with the transaction-based score and/or the user score. For example, the suggested actions may include utilizing a credit product, such as a credit card, and making timely payments on the credit product to increase the user's user score (e.g., credit score).

In some implementations, the user profile scoring platform may provide an offer for a product (e.g., a credit product) to the user (e.g., via the user device, by sending the offer to a physical address associated with the user, and/or the like). In some implementations, the user profile scoring platform may cause the user to be pre-authorized for a future transaction involving the product (e.g., cause the user to be pre-authorized to make purchases using the credit product).

In this way, the user profile scoring platform may facilitate the user improving the user's user score. This may allow the user to qualify for loans that the user would not otherwise qualify for and/or to qualify for lower lending rates that the user would otherwise be subject to without intervention by the user profile scoring platform. This prevents waste of computing resources (e.g., processing resources, memory resources, power resources, and/or the like) associated with shopping for and/or enrolling in other services to increase the user score.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
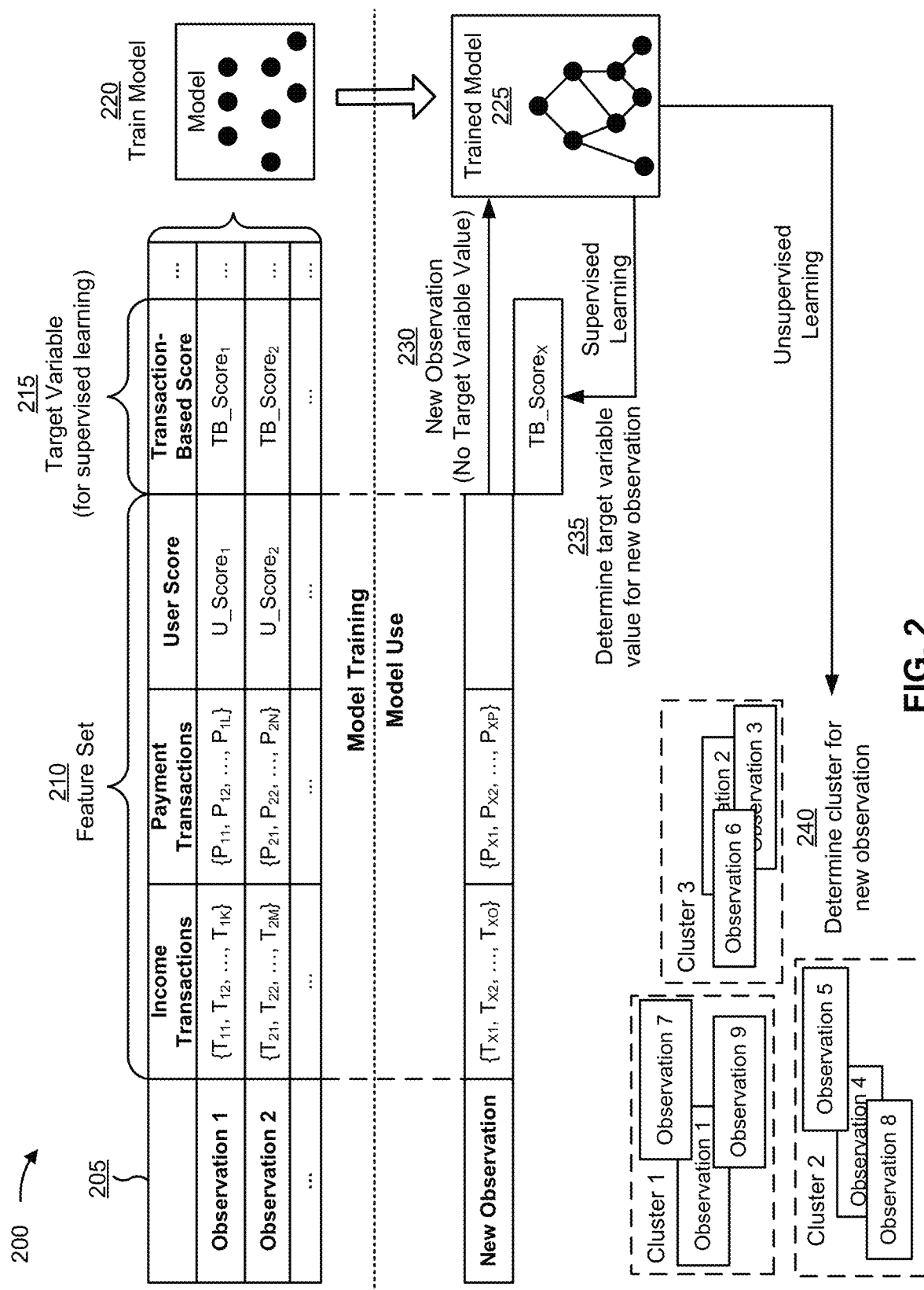
FIG. 2 is a diagram illustrating an example of training and using a machine learning model described herein.

FIG. 2 is a diagram illustrating an example 200 of training and using a machine learning model in connection with user profiling based on transaction data associated with a user. The machine learning model training and usage described herein may be performed using a machine learning system. The machine learning system may include or may be included in a computing device, a server, a cloud computing environment, and/or the like, such as user profile scoring platform 301, user device 330, transaction account platform 340, and/or server device 350 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from user profile scoring platform 301, user device 330, transaction account platform 340, and/or server device 350, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from user profile scoring platform 301, user device 330, transaction account platform 340, and/or server device 350. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of income transactions, a second feature of payment transactions, a third feature of a user score (e.g., a credit score), and so on. As shown, for a first observation, the first feature may have a value of $\{T_{11}, T_{12}, \ldots, T_{1K}\}$ (e.g., a first set of income transactions, where K≥1), the second feature may have a value of $\{P_{11}, P_{12}, \ldots, P_{1L}\}$ (e.g., a first set of payment transactions, where L≥1), the third feature may have a value of $U\_score_1$ (e.g., a first user score), and so on. These features and feature values are provided as examples, and may differ in other examples. For example, for a second observation, the first feature may have a value of $\{T_{21}, T_{22}, \ldots, T_{2M}\}$ (e.g., a second set of income transactions, where M≥1), the second feature may have a value of $\{P_{21}, P_{22}, \ldots, P_{2N}\}$ (e.g., a second set of payment transactions, where N≤1), the third feature may have a value of $U\_score_1$, and so on.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is a transaction-based score, which has a value of $TB\_Score_1$ for the first observation.

The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of $\{T_{X1}, T_{X2}, \ldots, T_{XO}\}$ (e.g., a new set of income transactions, where O≥1), a second feature of $\{P_{X1}, P_{X2}, \ldots, P_{XP}\}$ (e.g., a new set of payment transactions, where P≥1), but no third feature, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of TB_Scorex for the target variable of a transaction-based score for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first automated action may include, for example, designating a user as pre-authorized for a transaction involving a product.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a high transaction-based score cluster), then the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a low transaction-based score cluster), then the machine learning system may perform or cause performance of a second (e.g., different) automated action, such as provide a report to a user device that suggests actions to address issues with the transaction-based score.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determining a transaction-based score based on transaction data. The machine learning system enables recognition and/or identification of tens, hundreds, thousands, or millions of features and/or feature values for tens, hundreds, thousands, or millions of observations, thereby increasing accuracy and consistency and reducing delay associated with determining a transaction-based score relative to requiring computing resources to be allocated for tens, hundreds, or thousands of operators to manually determine a transaction-based score using the features or feature values.

As indicated above, FIG. 2 is provided as an example. Other examples may differ from what is described in connection with FIG. 2.

Figure 3:
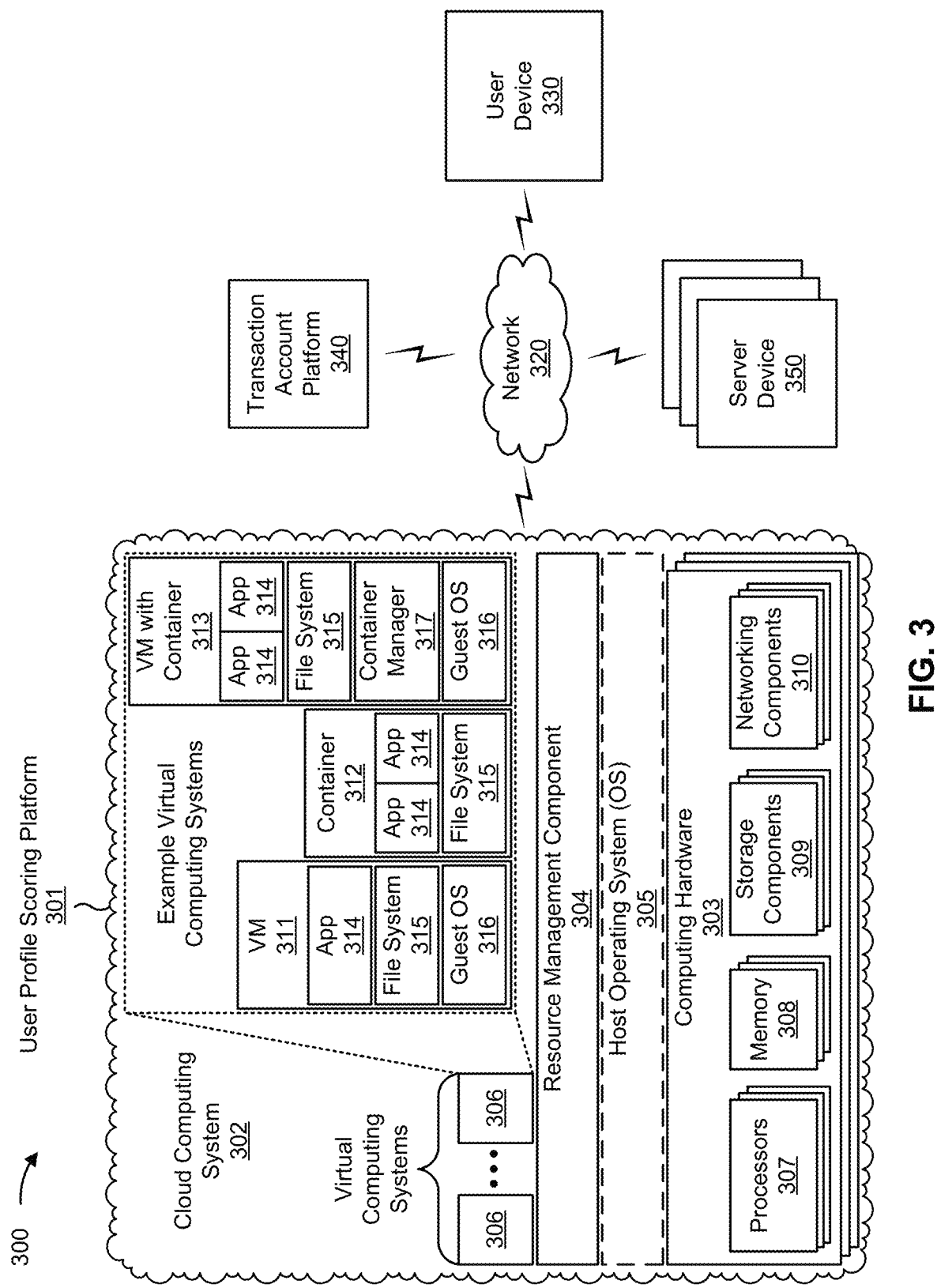
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user profile scoring platform 301, which may include one or more elements of and/or may execute within a cloud computing system 302. The cloud computing system 302 may include one or more elements 303-313, as described in more detail below. As further shown in FIG. 3, environment 300 may include a network 320, a user device 330, a transaction account platform 340, one or more server devices 350. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the user profile scoring platform 301 may include one or more elements 303-313 of the cloud computing system 302, may execute within the cloud computing system 302, and/or may be hosted within the cloud computing system 302, in some implementations, the user profile scoring platform 301 may not be cloud-based (e.g., may be implemented outside of a cloud computing system) or may be partially cloud-based. For example, the user profile scoring platform 301 may include one or more devices that are not part of the cloud computing system 302, such as device 400 of FIG. 4, which may include a standalone server or another type of computing device. The user profile scoring platform 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information associated with a user (e.g., employment-related information). For example, user device 330 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

Transaction account platform 340 includes one or more devices capable of receiving, generating, storing, processing, and providing information associated with managing a transaction account of a user. For example, transaction account platform 340 may be associated with one or more server devices that include a communication interface that allows transaction account platform 340 to receive information from and/or transmit information to other devices in environment 300. In some implementations, transaction account platform 340 may include and/or have access to a data structure used to maintain a transaction log of an account of the user, profile information associated with the user, preferences associated with the user, and/or the like.

Server device 350 includes one or more devices capable of storing, processing, and/or routing information associated with employment-related activity. For example, one or more of server devices 350 may host one or more user scoring platforms, one or more messaging platforms, and/or the like (e.g., similar to the platforms in FIG. 1A). In some implementations, server device 350 may include a communication interface that allows server device 350 to receive information from and/or transmit information to other devices in environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
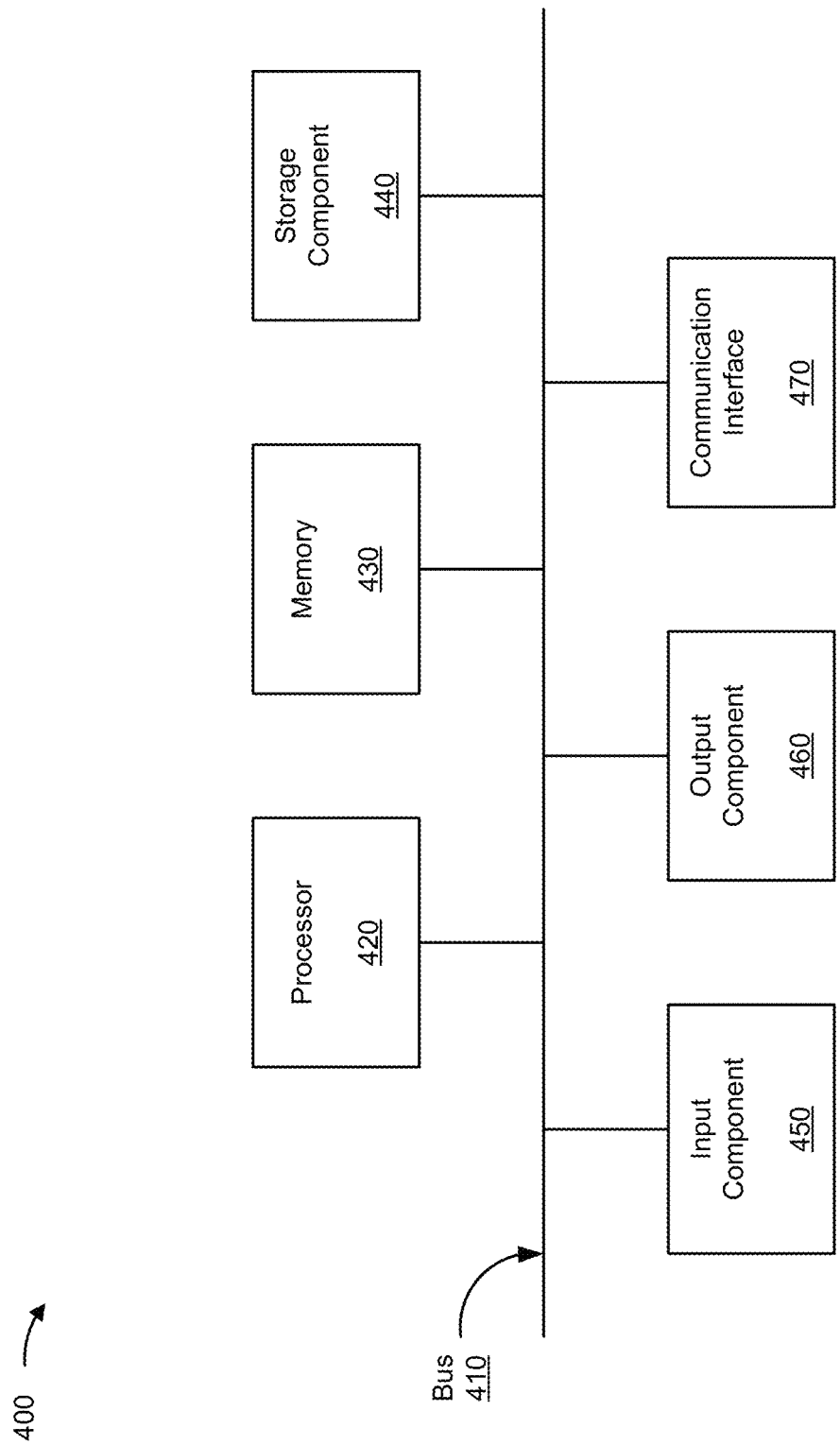
FIG. 4 is a diagram of example components of one or more devices of FIG. 3.

FIG. 4 is a diagram of example components of a device 400, which may correspond to user profile scoring platform 301, computing hardware 303, user device 330, transaction account platform 340, and/or server device 350. In some implementations user profile scoring platform 301, computing hardware 303, user device 330, transaction account platform 340, and/or server device 350 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
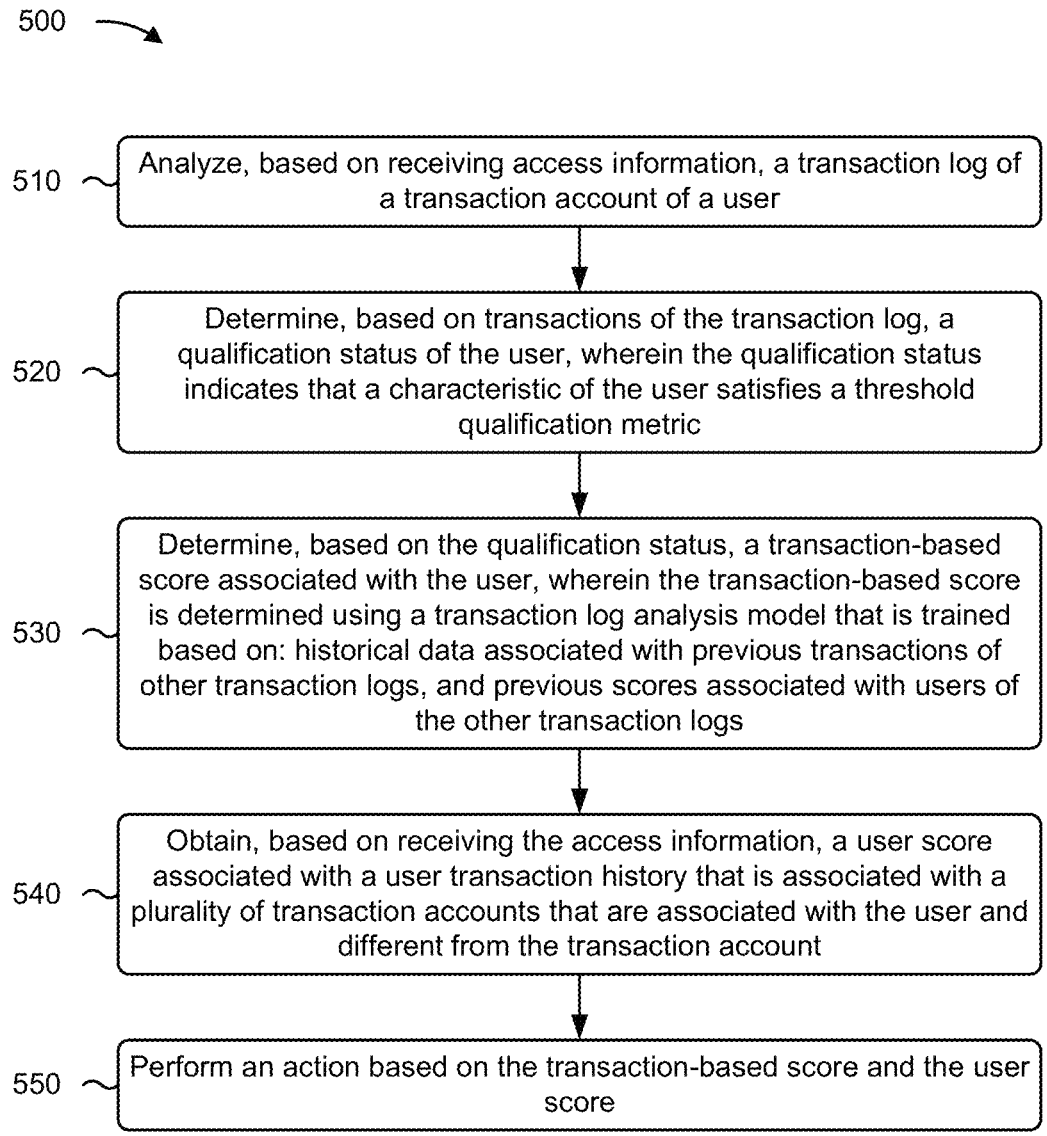
FIGS. 5-7 are flow charts of example processes relating to user profiling based on transaction data associated with a user.

FIG. 5 is a flow chart of an example process 500 associated with user profiling based on transaction data associated with a user. In some implementations, one or more process blocks of FIG. 5 may be performed by a device (e.g., user profile scoring platform 301). In some implementations, one or more process blocks of FIG. 5 may be performed by another device or a group of devices separate from or including the device, such as computing hardware 303, user device 330, transaction account platform 340, server device 350, and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include analyzing, based on receiving access information, a transaction log of a transaction account of a user (block 510). For example, the device may analyze, based on receiving access information, a transaction log of a transaction account of a user, as described above.

As further shown in FIG. 5, process 500 may include determining, based on transactions of the transaction log, a qualification status of the user, wherein the qualification status indicates that a characteristic of the user satisfies a threshold qualification metric (block 520). For example, the device may determine, based on transactions of the transaction log, a qualification status of the user, as described above. In some implementations, the qualification status indicates that a characteristic of the user satisfies a threshold qualification metric.

As further shown in FIG. 5, process 500 may include determining, based on the qualification status, a transaction-based score associated with the user, wherein the transaction-based score is determined using a transaction log analysis model that is trained based on historical data associated with previous transactions of other transaction logs and previous scores associated with users of the other transaction logs (block 530). For example, the device may determine, based on the qualification status, a transaction-based score associated with the user, as described above. In some implementations, the transaction-based score is determined using a transaction log analysis model that is trained based on historical data associated with previous transactions of other transaction logs and previous scores associated with users of the other transaction logs.

As further shown in FIG. 5, process 500 may include obtaining, based on receiving the access information, a user score associated with a user transaction history that is associated with a plurality of transaction accounts that are associated with the user and different from the transaction account (block 540). For example, the device may obtain, based on receiving the access information, a user score associated with a user transaction history that is associated with a plurality of transaction accounts that are associated with the user and different from the transaction account, as described above.

As further shown in FIG. 5, process 500 may include performing an action based on the transaction-based score and the user score (block 550). For example, the device may perform an action based on the transaction-based score and the user score, as described above.

Process 500 may include additional implementations, such as any single implementation or any combination of implementations described below and/or in connection with one or more other processes described elsewhere herein.

In a first implementation, process 500 includes receiving a user input that authorizes an analysis of the transaction account, wherein the user input includes the access information; and performing a verification process to verify that the user provided the user input, wherein the transaction log is analyzed based on results of performing the verification process.

In a second implementation, alone or in combination with the first implementation, determining the qualification status of the user comprises receiving a user input associated with the characteristic, wherein the user input indicates that the transaction account qualifies as a prioritized transaction account, and determining the qualification status of the user based on the user input.

In a third implementation, alone or in combination with one or more of the first and second implementations, the transaction log analysis model is configured to determine the transaction-based score based on at least one of a percentage of transactions identified in the transaction log that are associated with a transaction type or a time period associated with the transactions.

In a fourth implementation, alone or in combination with one or more of the first through third implementations, obtaining the user score comprises processing a message of a message account to determine the user score.

In a fifth implementation, alone or in combination with one or more of the first through fourth implementations, performing the action comprises determining a difference between the transaction-based and the user score and training the transaction log analysis model based on the difference and transaction data associated with the transaction log.

In a sixth implementation, alone or in combination with one or more of the first through fifth implementations, the action is a first action and process 500 further comprises determining, based on a difference between the transaction-based score and the user score, a condition associated with the user, and performing, based on the condition, a second action associated with the user.

In a seventh implementation, alone or in combination with one or more of the first through sixth implementations, performing the second action comprises at least one of providing, to a user device of the user, a report that addresses the difference, providing, to the user, an offer for a product that is configured to reduce the difference, or designating the user as pre-authorized for a future transaction involving the product.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
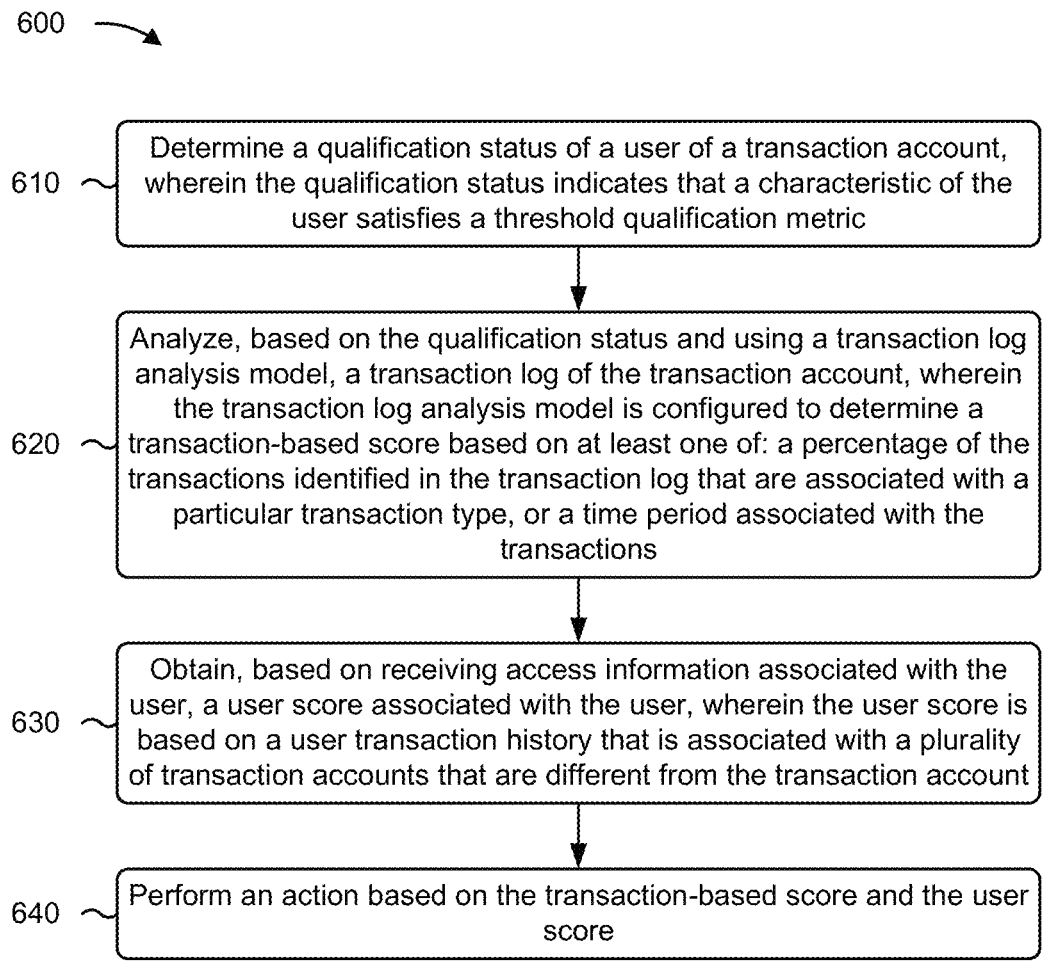

FIG. 6 is a flow chart of an example process 600 associated with user profiling based on transaction data associated with a user. In some implementations, one or more process blocks of FIG. 6 may be performed by a device (e.g., user profile scoring platform 301). In some implementations, one or more process blocks of FIG. 6 may be performed by another device or a group of devices separate from or including the device, such as computing hardware 303, user device 330, transaction account platform 340, server device 350, and/or the like. Additionally, or alternatively, one or more process blocks of FIG. 6 may be performed by one or more components of a device 400, such as processor 420, memory 430, storage component 440, input component 450, output component 460, communication interface 470, and/or the like.

As shown in FIG. 6, process 600 may include determining a qualification status of a user of a transaction account, wherein the qualification status indicates that a characteristic of the user satisfies a threshold qualification metric (block 610). For example, the device may determine a qualification status of a user of a transaction account, as described above. In some implementations, the qualification status indicates that a characteristic of the user satisfies a threshold qualification metric.

As further shown in FIG. 6, process 600 may include analyzing, based on the qualification status and using a transaction log analysis model, a transaction log of the transaction account, wherein the transaction log analysis model is configured to determine a transaction-based score based on at least one of a percentage of the transactions identified in the transaction log that are associated with a particular transaction type, or a time period associated with the transactions (block 620). For example, the device may analyze, based on the qualification status and using a transaction log analysis model, a transaction log of the transaction account, as described above. In some implementations, the transaction log analysis model is configured to determine a transaction-based score based on at least one of a percentage of the transactions identified in the transaction log that are associated with a particular transaction type, or a time period associated with the transactions.

As further shown in FIG. 6, process 600 may include obtaining, based on receiving access information associated with the user, a user score associated with the user, wherein the user score is based on a user transaction history that is associated with a plurality of transaction accounts that are different from the transaction account (block 630). For example, the device may obtain, based on receiving access information associated with the user, a user score associated with the user, as described above. In some implementations, the user score is based on a user transaction history that is associated with a plurality of transaction accounts that are different from the transaction account.

As further shown in FIG. 6, process 600 may include performing an action based on the transaction-based score and the user score (block 640). For example, the device may perform an action based on the transaction-based score and the user score, as described above.

Process 600 may include additional implementations, such as any single implementation or any combination of implementations described below and/or in connection with one or more other processes described elsewhere herein.

In a first implementation, the transaction log is analyzed based on receiving the access information from the user, and the access information authorizes an analysis of the transaction account and an obtaining of the user score.

In a second implementation, alone or in combination with the first implementation, the transaction log analysis model comprises a machine learning model that is trained based on historical data associated with previous transactions of other transaction logs and previous scores associated with users of the other transaction logs.

In a third implementation, alone or in combination with one or more of the first and second implementations, obtaining the user score includes sending, to a third party platform, a request for the user score; and receiving, from the third party platform or a user device associated with the user, the user score.

In a fourth implementation, alone or in combination with one or more of the first through third implementations, performing the action includes providing, to a user device of the user, a report that addresses a difference between the transaction-based score and the user score; providing, to the user, an offer for a product that is configured to reduce the difference; or designating the user as pre-authorized for a future transaction involving the product.

In a fifth implementation, alone or in combination with one or more of the first through fourth implementations, performing the action includes determining a difference between the transaction-based score and the user score and training the transaction log analysis model based on the difference and transaction data associated with the transaction log.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
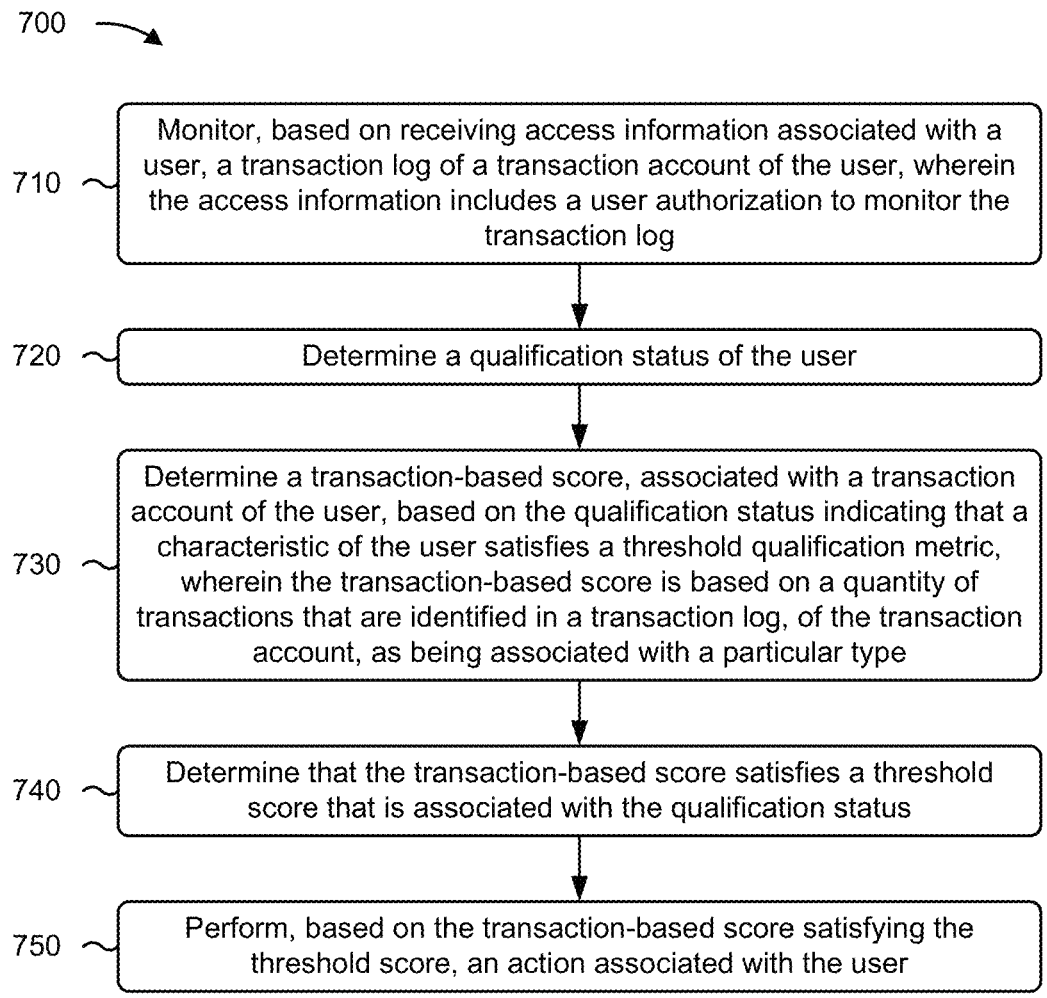

FIG. 7 is a flow chart of an example process 700 associated with user profiling based on transaction data associated with a user. In some implementations, one or more process blocks of FIG. 7 may be performed by a device (e.g., user profile scoring platform 301). In some implementations, one or more process blocks of FIG. 7 may be performed by another device or a group of devices separate from or including the device, such as computing hardware 303, user device 330, transaction account platform 340, server device 350, and/or the like. Additionally, or alternatively, one or more process blocks of FIG. 7 may be performed by one or more components of a device 400, such as processor 420, memory 430, storage component 440, input component 450, output component 460, communication interface 470, and/or the like.

As shown in FIG. 7, process 700 may include monitoring, based on receiving access information associated with a user, a transaction log of a transaction account of the user, wherein the access information includes a user authorization to monitor the transaction log (block 710). For example, the device may monitor, based on receiving access information associated with a user, a transaction log of a transaction account of the user, as described above. In some implementations, the access information includes a user authorization to monitor the transaction log.

As further shown in FIG. 7, process 700 may include determining a qualification status of the user (block 720). For example, the device may determine a qualification status of the user, as described above.

As further shown in FIG. 7, process 700 may include determining a transaction-based score, associated with a transaction account of the user, based on the qualification status indicating that a characteristic of the user satisfies a threshold qualification metric, wherein the transaction-based score is based on a quantity of transactions that are identified in a transaction log, of the transaction account, as being associated with a particular type (block 730). For example, the device may determine a transaction-based score, associated with a transaction account of the user, based on the qualification status indicating that a characteristic of the user satisfies a threshold qualification metric, as described above. In some implementations, the transaction-based score is based on a quantity of transactions that are identified in a transaction log, of the transaction account, as being associated with a particular type.

As further shown in FIG. 7, process 700 may include determining that the transaction-based score satisfies a threshold score that is associated with the qualification status (block 740). For example, the device may determine that the transaction-based score satisfies a threshold score that is associated with the qualification status, as described above.

As further shown in FIG. 7, process 700 may include performing, based on the transaction-based score satisfying the threshold score, an action associated with the user (block 750). For example, the device may perform, based on the transaction-based score satisfying the threshold score, an action associated with the user, as described above.

Process 700 may include additional implementations, such as any single implementation or any combination of implementations described below and/or in connection with one or more other processes described elsewhere herein.

In a first implementation, process 700 includes analyzing the transaction log to determine one or more transactions associated with the characteristic; estimating the characteristic based on the one or more transactions; and determining the qualification status based on the estimated characteristic.

In a second implementation, alone or in combination with the first implementation, the characteristic of the user is an income of the user, a payment requirement of the user, or a cash flow of the user.

In a third implementation, alone or in combination with one or more of the first through second implementations, performing the action is based on the transaction-based score and a user score, wherein the user score is associated with a plurality of transaction accounts that are different than the transaction account.

In a fourth implementation, alone or in combination with one or more of the first through third implementations, performing the action includes training a transaction log analysis model based on the transaction-based score and transaction data associated with the transaction log, wherein the transaction log analysis model was used to determine the transaction-based score.

In a fifth implementation, alone or in combination with one or more of the first through fourth implementations, performing the action includes providing, to a user device of the user, a report that addresses the transaction-based score; providing, to the user, an offer for a product that is configured to improve the transaction-based score; or designating the user as pre-authorized for a future transaction involving the product.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing instructions, the instructions comprising:
one or more instructions that, when executed by one or more processors, cause the one or more processors to:
monitor, based on receiving access information associated with a user, a transaction log of a transaction account of the user;
determine a qualification status associated with the user;
determine, based on the qualification status indicating that a characteristic of the user satisfies a threshold qualification metric, a transaction-based score associated with the transaction account,
wherein the transaction-based score is determined using a transaction log analysis model comprising a machine learning model that is trained based on historical data associated with previous transactions of a plurality of transaction logs including the transaction log, and based on previous scores associated with users of the plurality of transaction logs;
provide, based on receiving approval to obtain a score associated with the user, a link to a device associated with the user,
wherein the link enables a communication session to be established between the device and an external user-scoring platform,
wherein the communication session is established based on a verification process between the device and the external user-scoring platform, and
wherein a message is transmitted to a messaging account associated with the user based on the communication session being established;
determine that the transaction-based score satisfies a threshold score that is associated with the qualification status;
perform, based on the transaction-based score satisfying the threshold score, an action associated with the user; and
retrain, based on a difference between the transaction-based score and the score associated with the user, the machine learning model.

2. The non-transitory computer-readable medium of claim 1, wherein the one or more instructions, that cause the one or more processors to determine the qualification status, cause the one or more processors to:
analyze the transaction log to determine one or more transactions associated with the characteristic;
estimate the characteristic based on the one or more transactions; and
determine the qualification status based on the estimated characteristic.

3. The non-transitory computer-readable medium of claim 1, wherein the characteristic of the user is associated with at least one of:
an income associated with the user,
a payment requirement associated with the user, or
a cash flow associated with the user.

4. The non-transitory computer-readable medium of claim 1, wherein performing the action is based on the transaction-based score and the score associated with the user,
wherein the score associated with the user is associated with a plurality of transaction accounts that are different than the transaction account.

5. The non-transitory computer-readable medium of claim 1, wherein the one or more instructions, that cause the one or more processors to perform the action, cause the one or more processors to:
train a transaction log analysis model based on the transaction-based score and transaction data associated with the transaction log,
wherein the transaction log analysis model is used to determine the transaction-based score.

6. The non-transitory computer-readable medium of claim 1, wherein the one or more instructions, that cause the one or more processors to perform the action, cause the one or more processors to:
provide a report that addresses the transaction-based score;
provide an offer for a product that is configured to improve the transaction-based score; or
pre-authorize the user for a future transaction involving the product.

7. The non-transitory computer-readable medium of claim 1, wherein the transaction-based score is determined based on at least one of:
a percentage of transactions identified in the transaction log that are associated with a transaction type, or
a time period associated with transactions.

8. A device, comprising:
one or more memories; and
one or more processors, coupled to the one or more memories, configured to:

monitor, based on receiving access information associated with a user, a transaction log of a transaction account of the user;
determine a qualification status associated with the user;
determine, based on the qualification status indicating that a characteristic of the user satisfies a threshold qualification metric, a transaction-based score associated with the transaction account,
  wherein the transaction-based score is determined using a transaction log analysis model comprising a machine learning model that is trained based on historical data associated with previous transactions of a plurality of transaction logs including the transaction log, and based on previous scores associated with users of the plurality of transaction logs;
provide, based on receiving approval to obtain a score associated with the user, a link to another device associated with the user,
  wherein the link enables a communication session to be established between the other device and an external user-scoring platform,
  wherein the communication session is established based on a verification process between the other device and the external user-scoring platform, and
  wherein a message is transmitted to a messaging account associated with the user based on the communication session being established;
determine that the transaction-based score satisfies a threshold score that is associated with the qualification status;
perform, based on the transaction-based score satisfying the threshold score, an action associated with the user; and
retrain, based on a difference between the transaction-based score and the score associated with the user, the machine learning model.

9. The device of claim 8, wherein the one or more processors, when determining the qualification status, are configured to:
analyze the transaction log to determine one or more transactions associated with the characteristic;
estimate the characteristic based on the one or more transactions; and
determine the qualification status based on the estimated characteristic.

10. The device of claim 8, wherein the characteristic of the user is associated with at least one of:
an income associated with the user,
a payment requirement associated with the user, or
a cash flow associated with the user.

11. The device of claim 8, wherein performing the action is based on the transaction-based score and the score associated with the user,
wherein the score associated with the user is associated with a plurality of transaction accounts that are different than the transaction account.

12. The device of claim 8, wherein the one or more processors, when performing the action, are configured to:
train a transaction log analysis model based on the transaction-based score and transaction data associated with the transaction log,
wherein the transaction log analysis model is used to determine the transaction-based score.

13. The device of claim 8, wherein the one or more processors, when performing the action, are configured to:

provide a report that addresses the transaction-based score;
provide an offer for a product that is configured to improve the transaction-based score; or
pre-authorize the user for a future transaction involving the product.

14. The device of claim 8, wherein the transaction-based score is determined based on at least one of:
a percentage of transactions identified in the transaction log that are associated with a transaction type, or
a time period associated with transactions.

15. A method, comprising:
monitoring, by a device and based on receiving access information associated with a user, a transaction log of a transaction account of the user;
determining, by the device, a qualification status associated with the user;
determining, by the device and based on the qualification status indicating that a characteristic of the user satisfies a threshold qualification metric, a transaction-based score associated with the transaction account,
  wherein the transaction-based score is determined using a transaction log analysis model comprising a machine learning model that is trained based on historical data associated with previous transactions of a plurality of transaction logs including the transaction log, and based on previous scores associated with users of the plurality of transaction logs;
providing, by the device and based on receiving approval to obtain a score associated with the user, a link to another device associated with the user,
  wherein the link enables a communication session to be established between the other device and an external user-scoring platform,
  wherein the communication session is established based on a verification process between the other device and the external user-scoring platform, and
  wherein a message is transmitted to a messaging account associated with the user based on the communication session being established;
determining, by the device, that the transaction-based score satisfies a threshold score that is associated with the qualification status;
performing, by the device and based on the transaction-based score satisfying the threshold score, an action associated with the user; and
retraining, by the device and based on a difference between the transaction-based score and the score associated with the user, the machine learning model.

16. The method of claim 15, wherein determining the qualification status comprises:
analyzing the transaction log to determine one or more transactions associated with the characteristic;
estimating the characteristic based on the one or more transactions; and
determining the qualification status based on the estimated characteristic.

17. The method of claim 15, wherein the characteristic of the user is associated with at least one of:
an income associated with the user,
a payment requirement associated with the user, or
a cash flow associated with the user.

18. The method of claim 15, wherein performing the action is based on the transaction-based score and the score associated with the user, wherein the score associated with the user is associated with a plurality of transaction accounts that are different than the transaction account.

19. The method of claim 15, wherein performing the action comprises:
   training a transaction log analysis model based on the transaction-based score and transaction data associated with the transaction log,
      wherein the transaction log analysis model is used to determine the transaction-based score.

20. The method of claim 15, wherein performing the action comprises:
   providing a report that addresses the transaction-based score;
   providing an offer for a product that is configured to improve the transaction-based score; or
   pre-authorizing the user for a future transaction involving the product.

* * * * *